United States Patent [19]

Bjerede

[11] Patent Number: 5,073,869
[45] Date of Patent: Dec. 17, 1991

[54] SUPPRESSION OF SPURIOUS FREQUENCY COMPONENTS IN DIRECT DIGITAL FREQUENCY SYNTHESIZER

[75] Inventor: Bjorn E. Bjerede, La Jolla, Calif.

[73] Assignee: Titan Linkabit Corporation, San Diego, Calif.

[21] Appl. No.: 398,735

[22] Filed: Aug. 25, 1989

[51] Int. Cl.⁵ .............................................. G06F 1/02
[52] U.S. Cl. .................................................. 364/718
[58] Field of Search ................................ 364/718, 721

[56] References Cited

U.S. PATENT DOCUMENTS

| | | | |
|---|---|---|---|
| 4,482,974 | 11/1984 | Kovalick | 364/721 |
| 4,486,846 | 12/1984 | McCallister et al. | 364/721 |
| 4,652,832 | 3/1987 | Jasper | 364/721 |
| 4,809,205 | 2/1989 | Freeman | 364/721 |
| 4,893,316 | 1/1990 | Janc et al. | 364/221 |
| 4,901,265 | 2/1990 | Kerr et al. | 364/721 |
| 4,905,177 | 2/1990 | Weaver, Jr. et al. | 364/721 |
| 4,933,890 | 6/1990 | Nuytkens et al. | 364/721 |

Primary Examiner—Dale M. Shaw
Attorney, Agent, or Firm—Edward W. Callan

[57] ABSTRACT

A direct digital frequency synthesizer generates an analog waveform of a predetermined frequency from accumulated digital frequency words which, as accumulated, represent the phase of a sine wave of the predetermined frequency. The synthesizer includes a phase accumulator, a 4-bit non-linear digital-to-analog converter (DAC) and a sample and hold circuit. The phase accumulator includes a 4-bit coarse-component accumulator for accumulating coarse phase components of the digital frequency words and a fine-component accumulator for accumulating fine phase components of the digital frequency words. The phase accumulator increments the coarse-component accumulator in response to the accumulated fine phase components exceeding a predetermined value. The 4-bit non-linear DAC converts the four bits accumulated in the coarse-component accumulator into an analog waveform of the predetermined frequency. The phase accumulator suppresses the generation of spurious frequency components in the analog waveform by randomly dithering the rate at which the coarse component accumulator is incremented by the phase accumulator. The sample and hold circuit is coupled to the output of the nonlinear DAC for mitigating any glitch errors induced in the nonlinear DAC by sampling the analog waveform at such times as when glitch-induced errors are not present.

3 Claims, 1 Drawing Sheet

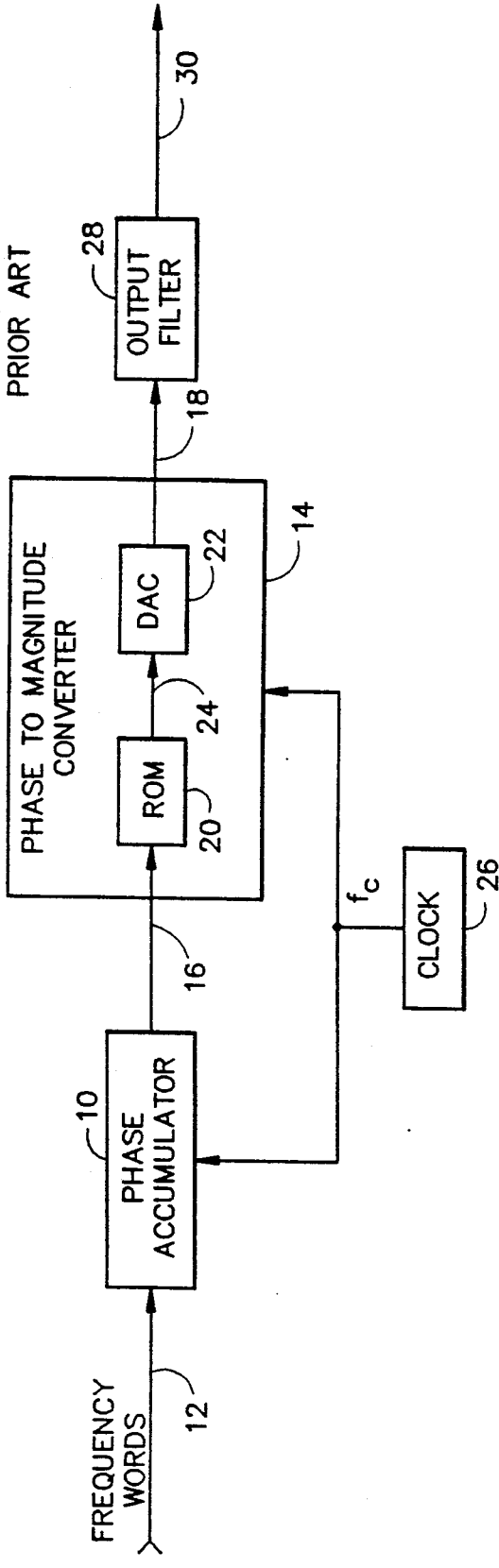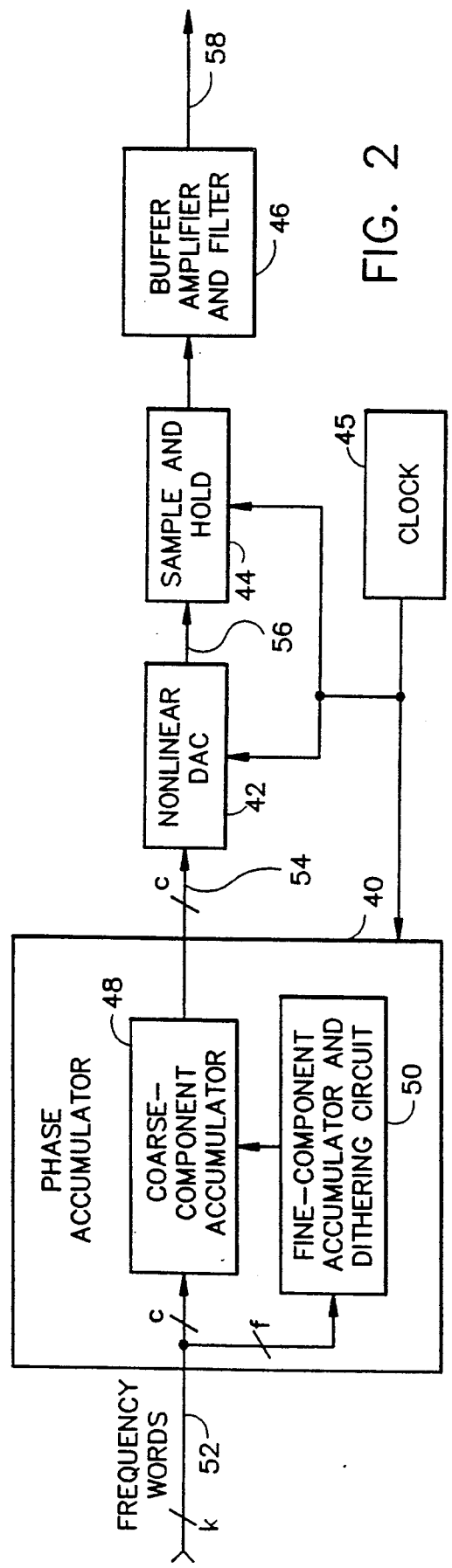

SUPPRESSION OF SPURIOUS FREQUENCY COMPONENTS IN DIRECT DIGITAL FREQUENCY SYNTHESIZER

BACKGROUND OF THE INVENTION

The present invention generally pertains to frequency synthesizers used in electronic communications and is particularly directed to an improvement in direct digital frequency synthesizers.

A direct digital frequency synthesizer generates an analog waveform of a predetermined frequency from accumulated digital frequency words which, as accumulated, represent the phase of a sine wave of said predetermined frequency. Referring to FIG. 1, a typical prior art direct digital frequency synthesizer includes a phase accumulator 10 for accumulating the digital frequency words 12 and a phase-to-magnitude converter 14 for converting the accumulated phase value 16 into an analog waveform 18 of the predetermined frequency. The phase-to-magnitude converter 14 includes a read-only memory (ROM) 20 and a linear digital-to-analog converter (DAC) 22 for converting the output 24 of the ROM 20 into the analog waveform 18. The ROM 20 converts the phase value accumulated in the phase accumulator 10 into a digital word 24, which when converted by the DAC 22, provides an analog signal magnitude for the phase angle of a sinusoidal waveform that is represented by the phase value in the phase accumulator 10. A clock 26 clocks the operations of the phase accumulator 10 and the phase-to-magnitude converter 14.

The phase accumulator 10 has a length of m bits and is driven at a clock rate $f_c$ by the clock 26. At each clock pulse, a frequency word 12 having a length of k bits is added to the present value in the accumulator 10. The value in the accumulator 10 increases at this rate until it overflows losing all bits that exceed $2^m - 1$. The phase value in the accumulator 10 at any time represents the instantaneous phase angle of a sinusoidal waveform over a range of $2\pi$ radians. This phase value is delivered to the ROM 20 in the form of an address to a lookup table implemented by the ROM 20 for conversion into a digital word 24 having a magnitude corresponding to the instantaneous sine value or magnitude.

The digital words provided by the ROM 20 are converted into the analog waveform 18 by the DAC 22. The finite number of magnitudes contained in the lookup table in the ROM 20 closely approximates the desired sinusoidal waveform magnitudes at the different phase values.

A low pass filter 28 is coupled to the output of the DAC 22 to reduce the resulting noise, spurious signals, and harmonics of the waveform 18 to acceptable levels, and thereby provides an analog output signal 30 at the frequency represented by the accumulated frequency words 12.

There are $2^m$ different phase values; and the actual output frequency is g times $f_c/2^m$, where g can range from one to $2^m$. The frequency resolution is also equal to $f_c/2^m$, which means that the resolution requirements can generally be met by trading off $f_c$ and m. Since this is a sampled data system, it is not possible to provide a single output sine wave frequency in excess of $\frac{1}{2} f_c$ and exceeding $\frac{1}{3} f_c$ is considered the limit of practicality for the low pass filter 28.

The phase accumulator 10 performs a phase calculation once each clock cycle by adding the frequency word, which is proportional to the desired output frequency, to the contents of the accumulator 10.

It is not practically feasible (or necessary) to retain every bit from the phase accumulator 10; so the phase accumulator 10 is divided into a coarse accumulator and a fine-component accumulator. The full m bits are partitioned into c bits in the coarse-component accumulator and f bits in the fine-component accumulator. "C" and "f" are intergers. Only the c bits of the coarse-component accumulator are used to determine the phase value for one cycle of phase accumulator output, whereby phase resolution is limited to $2\pi/2^c$ radians. Both the coarse-component accumulator and the fine-component accumulator are clocked by the clock 26 to run at a frequency of $f_c$. The minimum frequency that the coarse-component accumulator can provide is $f_c/2^c$ Hz. The fine-component accumulator provides finer frequency resolution by periodically adding a carry-in to the coarse-component accumulator's LSB of $2\pi/2^c$ radian. Given that the fine-component accumulator consists of f bits and also runs at $f_c$, the least carry-in rate it can provide is $f_c/2^f$. As each coarse LSB is worth $2\pi/2^c$ radians, the minimum average frequency added by the low accumulator is $2\pi/2^c$ times $f_c/2^f$ radians/second or $f_c/2^{c+f}$ Hz. Since $m = c + f$, the overall resolution, as weel as minimum step size remains unchanged by the separation.

Only the bits from the coarse-component accumulator (the c bits) are used to represent the necessary phase information with a resolution of $2\pi/2^c$ radian. As the remaining fine-component accumulator bits (the f bits) of the accumulator are ignored by the ROM 20, tthe output phase function generally has a phase error with respect to the total phase function contained in the phase accumulator 10. Since there is no precise sine look-up table for a ROM, one can only approximate the sine look-up table, and as a result unwanted error spurs (spurious signals) occur. Furthermore, the phase error is slightly periodic in time, with the resultant effect of spurious lines or phase modulation (PM) spurs in the output spectrum.

The width (number of bits) of the DAC 22 determines the level of the amplitude spurs in the analog waveform 18 due to quantization of the digital to analog conversion, and the time skew between bit states results in glitch energy spurs. At higher specified clock rates, each of these factors can limit both the synthesizer maximum operating frequency and the output spurious level suppression. Since the DAC 22 cannot provide infinite amplitude resolution, periodic time errors occur which also appear in the output spectrum as discrete spurious lines. The fact that the DAC 22 cannot provide a perfect transfer function between its digital and its analog output results in various errors.

Errors that affect the output spectrum are integral linearity (N steps are N least significant LSB's), differential linearity (step to step in one LSB), nonmonotonic errors (one step goes the wrong way) and "glitch". All terms except "glitch", refer to semistatic errors and may be treated as an amplitude error.

Any real DAC introduces additional errors due to imprecise level control. However, as long as these errors are on the order of $\pm \frac{1}{2}$ LSB as compared to an ideal value, the spurious level should be very nearly as predicted here.

The term 'glitch' identifies a property of a DAC where the output does not proceed smoothly from one step to the next. Instead, due to the fact that all current switches within the DAC used to convert digital information to analog levels do not switch precisely at the same instant, a short spike of current is observed at the output at the transitive edge. The amount of glitch is expressed in units of volt sec., which gives a figure of merit for comparing different DAC's. This value ranges between 2.5 and 25 pico volt sec. for a prior-art 8-bit DAC.

Since the glitch event time is short, to block them from reaching the output, a sample and hold is sometimes added to the output prior to the low-pass filter. Another method is to follow the DAC with an operational amplifier that cannot follow the glitch due to slew rate limitations.

In order to suppress the phase and amplitude spurs to less than −70 dBc a 12-bit coarse-component accumulator and an 11-bit DAC is required.

SUMMARY OF THE INVENTION

The present invention is an improved direct digital frequency synthesizer for generating an analog waveform of a predetermined frequency from accumulated digital frequency words which, as accumulated, represent the phase of a cyclic waveform of said predetermined frequency. The frequency synthesizer of the present invention includes a c-bit coarse-component accumulator for accumulating coarse phase components of the digital frequency words; means for accumulating fine phase components of the digital frequency words; means for incrementing the coarse-component accumulator in response to the accumulated fine phase components exceeding a predetermined value; a c-bit non-linear digital-to-analog converter for converting the c bits accumulated in the coarse-component accumulator into an analog waveform of said predetermined frequency; and means for suppressing the generation of spurious frequency components in the analog waveform by randomly dithering the rate at which the coarse component accumulator is incremented by said incrementing means.

Since a four-bit output of the accumulating means corresponds to exactly 16 discrete phases ($n \times 22.5°$, $n=0 \ldots 15$) the required output magnitudes for a sine wave take only eight different values 0, $\pm A_0 \sin 22.5°$, $\pm A_0 \sin 45°$, $\pm A_0 \sin 67.5°$ and $A_0$, where $A_0$ is a reference voltage. Even though a twelve-bit DAC is capable of generating 4096 discrete values, only eight of these will ever be used. When the combined effect of the ROM and the DAC of the phase-to-magnitude converter in the prior art synthesizer is considered, it is clear that its function is equivalent to a 4-bit digital-phase-to-analog-amplitude converter. The amplitude spurs depends on the accuracy with which these discrete voltages can be generated, not upon the number of input bits. For $10^4$ conversion accuracy the amplitude spurs will be below −70 dBc.

The nonlinear DAC of the direct digital synthesizer of the present invention generates exactly the sine-wave analog waveform magnitudes that are required without the aid of a look-up ROM. As a result the direct digital synthesizer of the present invention is far less complex than a prior art direct digital synthesizer using a ROM and a linear 12-bit DAC, while providing identical spurious signal suppression.

The direct digital synthesizer of the present invention also has better phase noise performance and possibly less complexity than a linear DAC used with an amplitude dithered ROM.

Additional features of the present invention are described in relation to the description of the preferred embodiment.

BRIEF DESCRIPTION OF THE DRAWING

FIG. 1 is a block diagram of a prior art direct digital frequency synthesizer.

FIG. 2 is a block diagram of the direct digital frequency synthesizer of the present invention.

DESCRIPTION OF THE PREFERRED EMBODIMENT

Referring to FIG. 2, a preferred embodiment of a direct digital synthesizer according to the present invention includes a phase accumulator 40, a nonlinear DAC 42, a sample-and-hold circuit 44, a clock 45 and a buffer amplifier 46. The phase accumulator 40 includes a c-bit coarse component accumulator 48 and an f-bit fine component accumulator 50.

The phase accumulator 40 is an m-bit accumulator for accumulating phase components of k-bit digital frequency words 52. The digital frequency words 52, as accumulated, represent the phase of a sine wave of a predetermined frequency.

The c-bit coarse-component accumulator 48 accumulates coarse phase components of the digital frequency words 52; and the f-bit fine-component accumulator accumulates fine phase components of the digital frequency words 52.

The phase accumulator 40 increments the coarse-component accumulator 48 in response to the accumulated fine phase components in the fine-component accumulator 50 exceeding a predetermined value.

The c-bit coarse-component accumulator 48 provides a c-bit output 54. In the preferred embodiment "c" is four, since as discussed above, a c-value of four provides a $10^4$ conversion accuracy, which enables the amplitude spurs to be below −70 dBc.

The nonlinear DAC 42 is a c-bit nonlinear DAC, which converts the c bits 54 accumulated in the coarse-component accumulator 48 into a sine-wave analog waveform 56 of the predetermined frequency.

The phase accumulator 40 suppresses the generation of spurious frequency components in the analog waveform by randomly dithering the phase at which the coarse component accumulator 48 is incremented by the phase accumulator 40. The preferred dithering technique is described in a copending U.S. Patent application, Ser. No. 07/398,703 entitled "Phase Accumulator With Dithered Incrementing Of Accumulation Due To Fine Phase Components", filed on Aug. 25, 1989 by Karl E. Moerder, now U.S. Pat. No. 4,984,186.

The sample-and-hold circuit 44 mitigates spurs induced by glitch in the nonlinear DAC 42 by sampling the analog signal 56 at such times as when the glitch-induced errors are not present. The sample-and-hold circuit 44 has a small but repeatable error pattern at the clock rate of the nonlinear DAC 42. These errors are at multiples of the clock and are filtered out by the filter in the buffer amplifier and filter 46 to provide an analog output signal 58 of the predetermined frequency, in which the spurious frequency components have been suppressed and the glitch-induced spurs have been mitigated.

The clock 45 clocks the operation of the phase accumulator 40, the registering of the c-bit output 54 of the coarse-component accumulator 48 into the nonlinear DAC 42, and the sampling of the analog signal 56 by the sample and hold circuit 44.

The phase accumulator 40 is implemented in one integrated circuit chip; the nonlinear DAC 42 and the sample-and-hold circuit 44 are implemented in a second integrated circuit chip and the buffer amplifier and filter 46 is implemented in a third integrated circuit chip.

The internal interconnections between these three chips consists of just four lines between the phase accumulator chip and chip including the nonlinear DAC, and but a single line between the nonlinear DAC chip and the buffer amplifier and filter chip. This greatly simplifies self-test and fault isolation. Because of the very high speed circuitry the interconnects must be transmission lines which favors a thin-film hybrid packaging approach. All three chips are implemented using existing discrete GaAs components.

I claim:

1. A frequency synthesizer for generating an analog waveform of a predetermined frequency from accumulated digital frequency words which, as accumulated, represent the phase of a cyclic waveform of said predetermined frequency, comprising a c-bit coarse-component accumulator for accumulating coarse phase components of the digital frequency words wherein c is an integer;

means for accumulating fine phase components of the digital frequency words;

means for incrementing the coarse-component accumulator in response to the accumulated fine phase components exceeding a predetermined value;

a c-bit non-linear digital-to-analog converter for converting the c bits accumulated in the coarse-component accumulator into an analog waveform of said predetermined frequency; and means for suppressing the generation of spurious frequency components in the analog waveform by randomly dithering the rate at which the coarse component accumulator is incremented by said incrementing means.

2. A frequency synthesizer according to claim 1, wherein "c" equals four.

3. A frequency synthesizer according to claim 1, further comprising sample and hold means coupled to the output of the nonlinear digital-to-analog converter for mitigating any glitch errors induced in the nonlinear digital-to-analog converter by sampling the analog waveform at such times as when glitch-induced errors are not present.

* * * * *